United States Patent [19]
McCoy et al.

[11] Patent Number: 5,812,864
[45] Date of Patent: Sep. 22, 1998

[54] PERSONAL COMPUTER/HOST EMULATION SYSTEM FOR HANDLING HOST DATA WITH PERSONAL COMPUTER APPLICATION PROGRAMS AT PERSONAL COMPUTERS

[75] Inventors: Glenn Clarence McCoy, Nichols, N.Y.; Eric Norman Yiskis, Lompoc, Calif.

[73] Assignee: International Business Machines Corporation, Endicott, N.Y.

[21] Appl. No.: 567,844

[22] Filed: Dec. 6, 1995

Related U.S. Application Data

[63] Continuation of Ser. No. 313,845, Sep. 28, 1994, abandoned, Ser. No. 734,444, Jul. 22, 1991, abandoned, and Ser. No. 727,534, Jul. 9, 1991, Pat. No. 5,136,681.

[51] Int. Cl.$^6$ ....................................................... G06F 7/32
[52] U.S. Cl. ...................................... 395/800; 395/200.18
[58] Field of Search .............................. 395/800, 200.01, 395/500, 200.18

[56] References Cited

U.S. PATENT DOCUMENTS

| | | | |
|---|---|---|---|
| 4,641,262 | 2/1987 | Bryan et al. | 340/745 |
| 4,665,501 | 5/1987 | Saldin et al. | 340/711 |
| 4,949,248 | 8/1990 | Caro | 364/401 |

OTHER PUBLICATIONS

Gilbert Held, Comminicating with the IBM PC Series, John Wiley & Sons, May 1988 pp. 240–259.

*Primary Examiner*—Mehmet B. Geckil
*Attorney, Agent, or Firm*—Hugh D. Jaeger

[57] ABSTRACT

A system for emulating the operation of a terminal connected to a host computing system while retaining the ability to utilize personal computer application programs resident in the personal computer by utilizing a personal computer/host terminal emulation program which conducts an analysis of host data and keystrokes to identify personal computer commands and calls the appropriate resident application program in response to such commands.

7 Claims, 8 Drawing Sheets

PERSONAL COMPUTER/HOST EMULATION SYSTEM FOR HANDLING HOST DATA WITH PERSONAL COMPUTER APPLICATION PROGRAMS AT PERSONAL COMPUTERS

This application is a continuation of application Ser. No. 08/313,845, filed Sep. 28, 1994 now abandoned, a CONT of Ser. No. 07/734,444 Jul. 22, 1991 now abandoned, a CONT of Ser. No. 07/727,534 Jul. 9, 1991 U.S. Pat. No. 5,136,681.

TECHNICAL FIELD

This invention is directed to a system for the connection of a personal computer, operating as a terminal emulator, to a host system in a manner which allows data existent in the host system to be extracted from the host, manipulated by a personal computer using a conventional personal computer program, and the modified data returned to the host system for storage.

In particular, the invention pertains to a personal computer terminal emulation system which accommodates a first, emulation, operating mode in the host in conventional fashion and a second, personal computer, operating mode in which data extracted from the host system while operating in the emulation mode may be processed with conventional personal computer application programs.

BACKGROUND ART

Personal computers have found widespread application as terminals connected to a substantially larger host system. In this application, the personal computer operates under the control of an "emulator" program, resident in the personal computer, which causes the personal computer to function in the same fashion, i.e., emulate, a conventional terminal. When operating in the emulation mode of the prior art systems, the personal computer is incapable of performing functions other than those of the terminal which is being emulated. Thus, the diverse and powerful functions which are capable of being performed by the personal computer, operating as such, are not available in the emulation mode.

The wide variety of programs available for use on personal computers provides a potential user with an assortment of tools which accommodate almost any computer task. Some of the more common applications, such as spread sheets and word processing, have many different programs, each of which has certain advantages and disadvantages. This proliferation has led to a lack of uniformity in the way in which data is formatted, the use of different control characters, and the presence of functions or operations which are unique to each program.

In some areas, notably word processing, programs have been devised to convert documents written with one word processing program to the format of another word processing program. This allows a document prepared with a first program to be altered and printed with a second, different, program. An example of such an approach is described in U.S. Pat. No. 4,503,516, assigned to assignee of this invention. The system of that patent describes an interconnection arrangement which allows conversion of documents between DisplayWriter (DW) format and PROFS (Professional Office System) format. The DisplayWriter format is used by a stand alone device, such as the system of the same name or a personal computer, and the Professional Office System is used as a host system such as an IBM System/370.

The systems of the prior art have generally operated in a batch fashion to convert the entire document from a first format to a second format. This has the disadvantage that the entire document must be so converted even if only a minor change in the document is to be made. The inefficiency of this approach is even more obvious in the case where it is only desired to visually present the document to the operator. Even in the case where it is desired only to read the document, the prior art approach requires that the entire document must be first converted to the format of the personal computer and then reconverted back to the original format when stored in the host system.

Additionally, it would be desirable to utilize the abundance of specialized functions provided by programs available for personal computers to process data from a host system which may have been produced with a program unrelated to the program in the personal computer. The previous example involved two different word processing programs. Such programs are related to the same basic problem and the conversion between them could even be classified as straightforward. However, in the case where a numerical table exists in the word processing document, it is often desirable to apply numeric programs to this portion of the document. It would be desirable to be able to perform calculations on numeric data and insert the result of the calculation into a host document without the need to exit from the host emulation program, call up the application program, fetch the file from the host, perform the calculation, exit from the application program and reenter the host emulation program. While programs for this purpose do exist, they are specialized for particular programs, and therefore, lack the ability to accommodate data from programs not contemplated by the designer.

The prior art approaches to the problem have generally required conversion of all the data from the first to the second format prior to use of the second program; and were available, only for interchanges between a limited set of programs. The requirement for conversion prior to use of the second program imposes a substantial burden in terms of conversion processing, and may even require conversion which is unnecessary in the sense that portions of the converted data may never be used or modified. Despite the fact that processors are operating at ever increasing speeds and efficiencies, there is nevertheless a finite delay between the time the operator requests a document for conversion processing and the time that document is actually available for use or modification by the operator.

An example of a prior art terminal emulation program is the IBM PC 3270 Emulation Program available from International Business Machines Corp., the assignee of this invention. Turbo Pascal 4.0, IBM Version for IBM PS/2 (IBM Corp.™), PC XT (IBM Corp.™) and AT (IBM Corp.™), a high level language selected for expression of the preferred embodiment of this invention is available from Borland International, 4585 Scotts Valley Drive, Scotts Valley, Calif. 95066. C Complier, an alternative high level language for expression of the program of this invention, is available from the International Business Machines Corp., P.O. Box 1328W, Boca Raton, Fla. 33429-1328. Macro Assembler Version 2.0, also available from the International Business Machines Corp., is also helpful in implementing the invention. Terminate and stay resident programs which are used in the implementation of this invention, are described in "The History and Technology of TSR; Terminate and Stay Resident Software", pp 39–49, an article by Steve Gibson in *RAM LORD USER'S MANUAL*, published by Waterworks Software, Inc., 913 Electric Avenue, Seal Beach, Calif. 90740.

DISCLOSURE OF THE INVENTION

It is therefore an object of this invention to provide a system in which a document or data file, resident in a host system in a first format according to a first program, can be visually displayed on a personal computer or like device and modified by the use of a second program which may have a different data format than the first program.

It is another object of this invention to provide a system in which the modification of data recorded in a format according to a first program may be accomplished with a second program, having a format differing from the first program, without the need for conversion of the entire data file.

It is a further object of this invention to provide a system which allows modification of data, stored in a host system and recorded in a format according to a first program, by a personal computing system utilizing a second program having a different format by utilizing the display buffer of the personal computer as a facility shared by the personal computer and the host system.

These and other objects of this invention are accomplished by a personal computer terminal emulation program resident in a personal computer, connected for use with a host system containing data stored according to a first format, which allows the personal computer operating in an emulation mode to directly utilize an application program, requiring data according to a second form, to modify, record and otherwise process data which is stored in the buffer associated with the display of the personal computer, which returns the processed data back to the host computer when execution of the operation is completed.

Appendix 1 is a program listing of the preferred embodiment written in Turbo Pascal for execution on an IBM Personal Computer connected to an IBM System/370.

DESCRIPTION OF THE INVENTION

Figure 1:
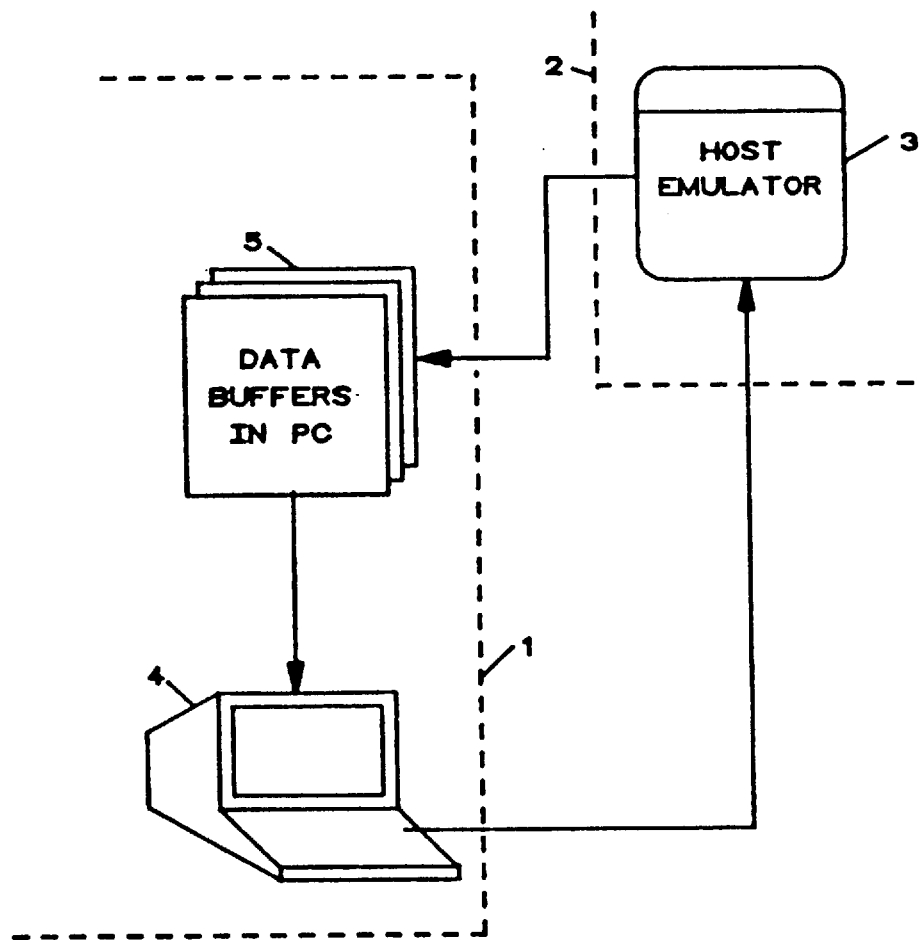
FIG. 1 is an illustration of a prior art technique for the operation of a terminal in a host environment.

The system shown in FIG. 1 is representative of the prior art approach to the problem. Where the personal computer 1 is to be used as a terminal, the conventional approach would be to have the host system 2, a large or central data processing system, provide the support for the terminal by means of an emulator 3, which is resident in the host mainframe. This required all the keystrokes at the personal computer 1 to be passed to the host system 2 for processing. The display screen 4 at the personal computer 1 was generated at the host system 2 and passed to the data buffers 5 in the personal computer 1. Such a system is limited to the emulators contained in the host system and does not utilize either the computing power of the personal computer 1 or the multitude of application programs available for such computers.

Figure 2:
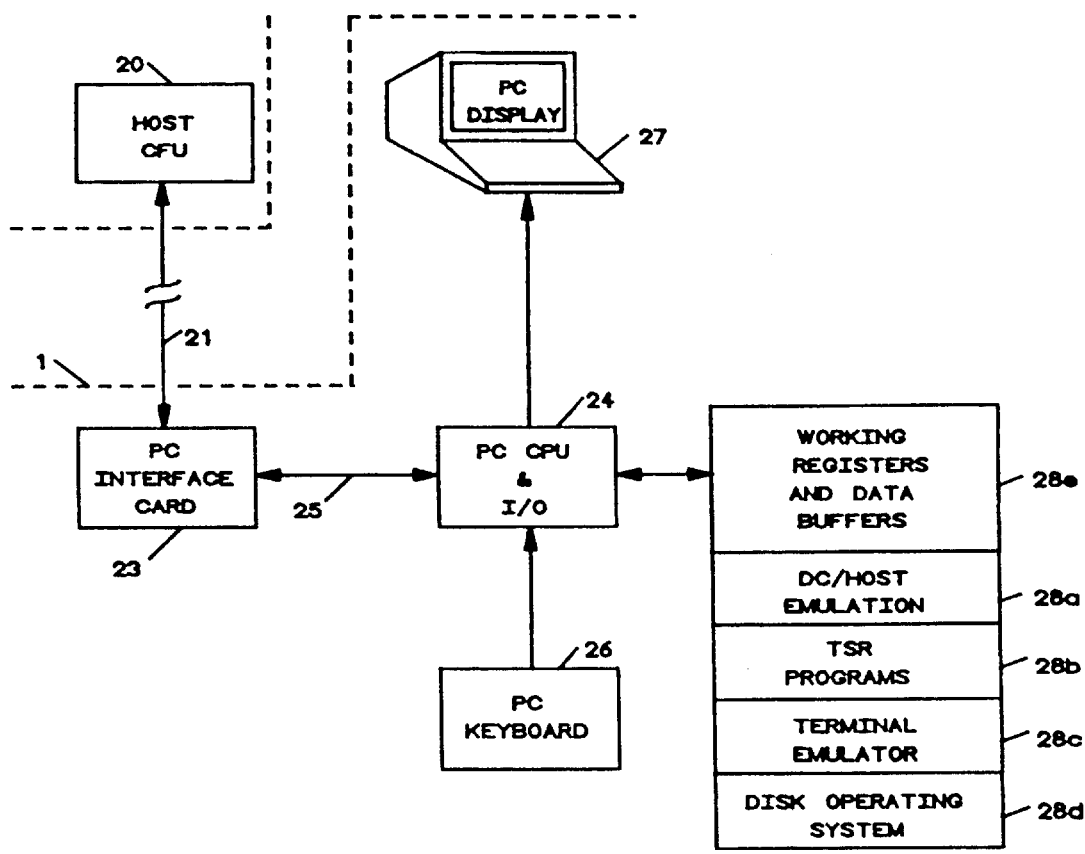
FIG. 2 is an illustration of the system hardware arrangement which is used to practice the invention.

As shown in FIG. 2 the hardware arrangement used to practice the invention includes the CPU 20 within the host system 2, which is connected via a conventional communications interface 21 to the personal computer interface card 23 which resides within the personal computer 1. The interface card 23 is connected to the personal computer CPU 24 over bus 25. A conventional keyboard 26 and display 27 are connected to CPU 24 in conventional fashion. Random access memory (RAM) 28 has a portion 28a dedicated to storage of the software program which performs the functions of the invention. Additional portions 28b, 28c and 28d are devoted to the storage of PC application programs which are of the class known as terminate and stay resident (TSR) programs, the terminal emulator program, and the disk operating system, respectively. Terminate and stay resident programs are described in "The History and Technology of TSR; Terminate and Stay Resident Software", pp 39–49, *Ram Lord User's Manual*, published by Waterworks Software, Inc., 913 Electric Avenue, Seal Beach, Calif. 90740. Very simply, such programs are designed to run on a personal computer under DOS and are continually resident in random access memory and are called into action by a specific pointer, in this case, developed by the actuation of a "hot" key or keys. Random access memory 28 also contains a portion 28e devoted to various working register and data buffers used by the programs.

Figure 3:
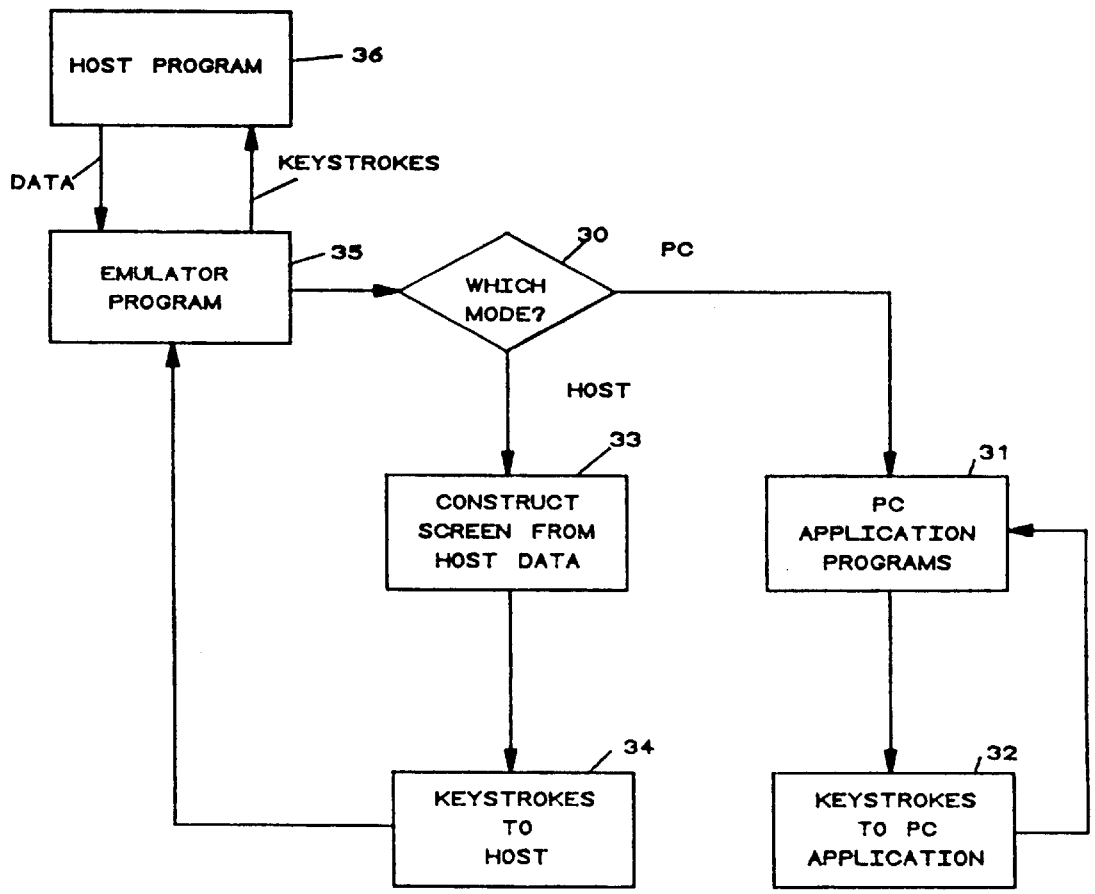
FIG. 3 is a programming flow chart showing the fashion in which the system toggles between the PC/host emulation program and the PC mode.

FIG. 3 illustrates how the system toggles back and forth between the host terminal emulation mode and the PC mode. The user may cause the system to switch from one mode to the other by depressing the selected key or a selected combination of keys which then develops the appropriate pointer. The PC/host emulation program monitors the keyboard to detect the actuation of the selected key or combination of keys representing PC application program functions as shown in block 30. When the PC mode is selected by actuation of a key representing a PC application program function, the program branches to block 31, causing the selection of the appropriate PC application program and the desired function. The system remains in the PC application mode until the appropriate key (or keys) is depressed, which actuates block 30 to cause the system to switch back to the host emulation mode.

In the terminal emulation mode, as will later be described in more detail, the screen is constructed from data obtained from the host in accordance with block 33. The keystrokes in this mode are detected by block 34 and sent to the host via the emulator program as shown in block 35. The host operates to interpret the keystrokes in conventional fashion in accordance with the host program as shown in block 36. Data resident in the host may be sent to the emulator program as shown.

Figure 3A:
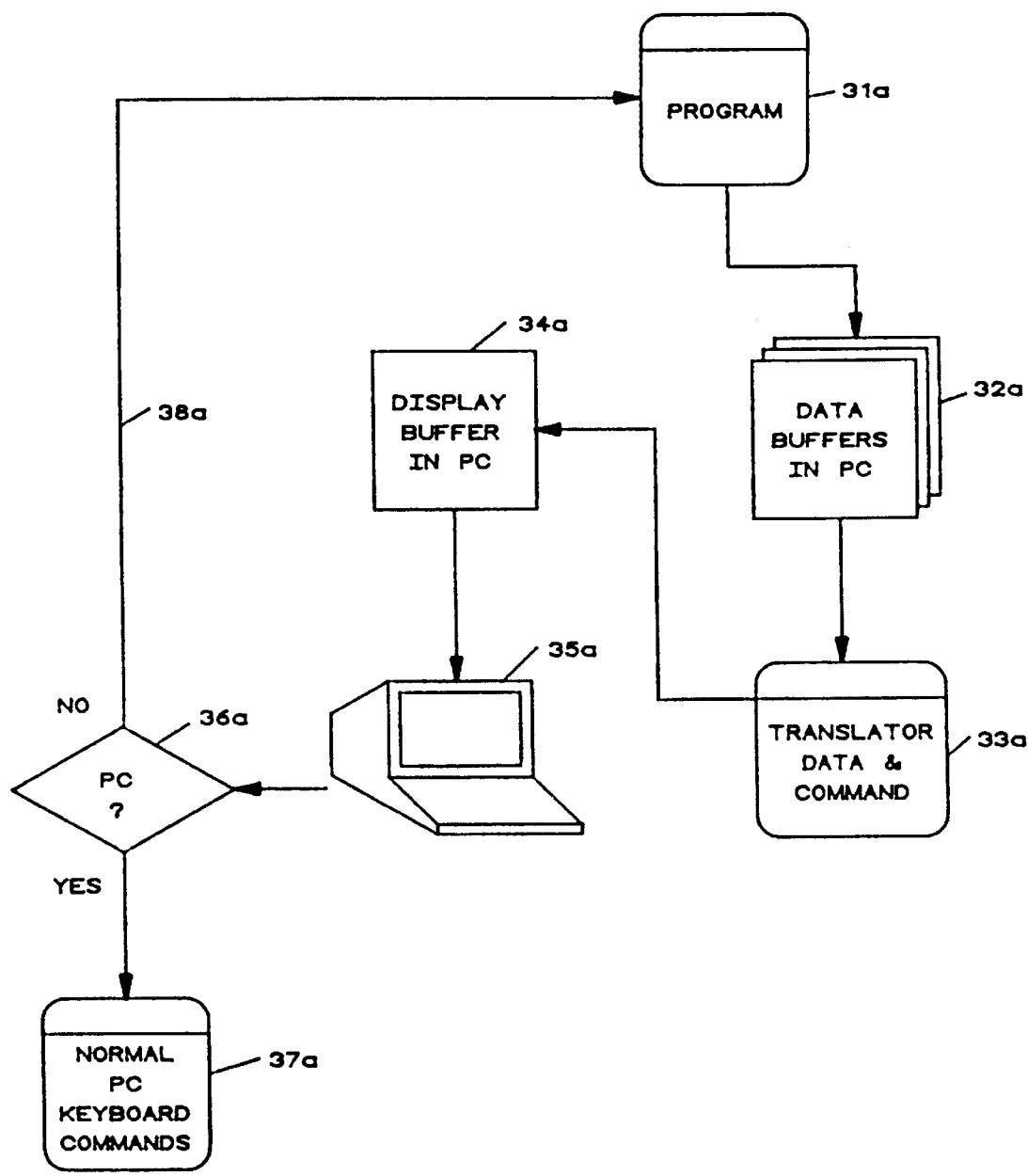
FIG. 3a is an illustration of the basic functional aspects of the system used to practice the invention.

FIG. 3a provides an overview of the various functional aspects of the invention. When operating under control of the PC/host terminal emulation program, two fundamental functions are performed on a recurring basis. The first function is to monitor host data to sense a host data update. The data supplied to the personal computer at the outset of the operation may be independently updated by the host system during a PC session. That is, the data previously supplied to the personal computer by the host system may become obsolete during the course of the PC session. For this reason, the PC/host emulation program continuously monitors the host data to determine if any changes have been made since the last update.

The second function is to monitor the personal computer keyboard for activity. Depression of a key on the keyboard can signal the entry of new data on the screen, or it can be a command such as would require host activity or the calling of a terminate and stay resident application program resident in the personal computer.

At the outset, the host data, which will most commonly represent a screen on the host display, is translated into PC format by data translation portion 31a emulation program. The host display data, now in PC format, is loaded into a data buffer 32a in the PC. Since the PC display commonly responds to codes which differ from the display codes of the host, a further translation into PC display codes by the display translation portion 33a of the emulation program is performed. The resulting data, in the PC display format, is loaded into the PC display buffer 34a and presented on the PC keyboard/display 35a.

Keystrokes on the keyboard/display 35a are examined by the keystroke interpretation portion 36a of the emulation program to determine whether a PC or a host function is required. Program block 36a is responsive to the selected mode. In the PC mode, the keystrokes are handled by block 37a as normal keyboard commands or data. In the emulation mode, the keystrokes representing the host keys are passed to the host processor via the host emulator 31a.

Figure 4:
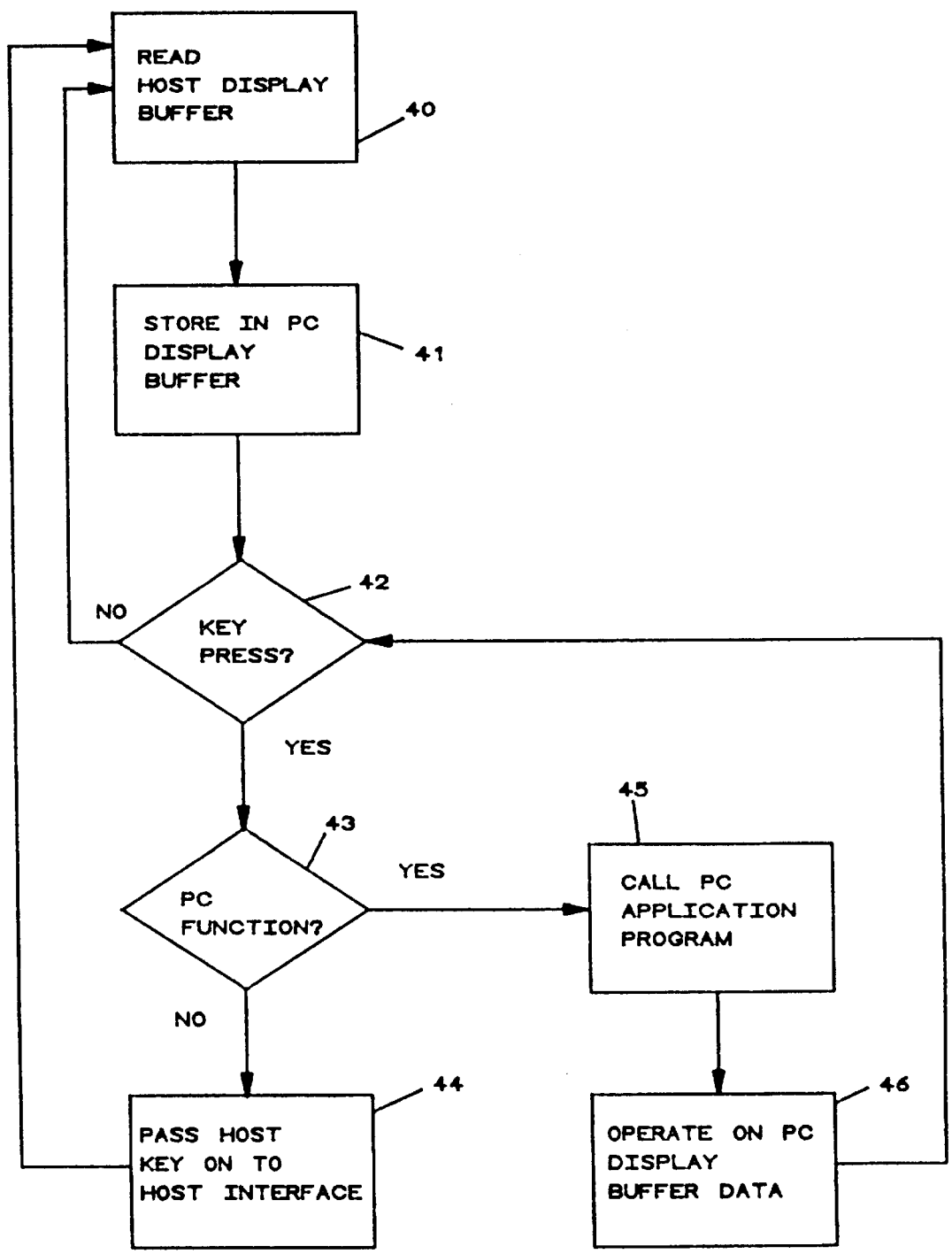
FIG. 4 is a programming flow chart showing an overview of the operation of the program.

The data flow chart of FIG. 4 represents an overview of the operation of the PC/host terminal emulation program. Beginning with block 40, the program reads the host display buffer in search of new information. The content of the host display buffer is first translated into PC format and further translated into the appropriate PC display codes for storage in the PC display buffer at block 41 to display the host screen contents on the PC display screen.

The PC/host terminal emulation program then checks to see if there has been a PC application program key depressed as shown in block 42. A PC application program key is one which has been specifically designated as a "hot" key which operates to call in a particular PC terminate and stay resident application program. In contrast to prior art terminal emulation programs which disabled the "hot" keys, the program of this invention allows use of the hot keys while in the terminal emulation mode. That is, the operator is permitted to call PC application programs and their functions by the depression of the appropriate hot key. If a hot key has not been depressed, the program loops back to block 40 in search of new host display information. If there has been a PC key depressed, the program branches to the test for a PC function in block 43. If the depressed key is not a PC function, it is necessarily a host key function, and block 44 causes the program to branch back to block 40, passing the host key information to the host for display and/or command action. If the depressed key represents a PC function, block 43 passes the program to block 45, which calls the appropriate PC application program. The specified PC application program then operates on the data in the PC display buffer as shown in block 46 and branches back to block 42 to check for actuation of a PC key.

Figure 5:
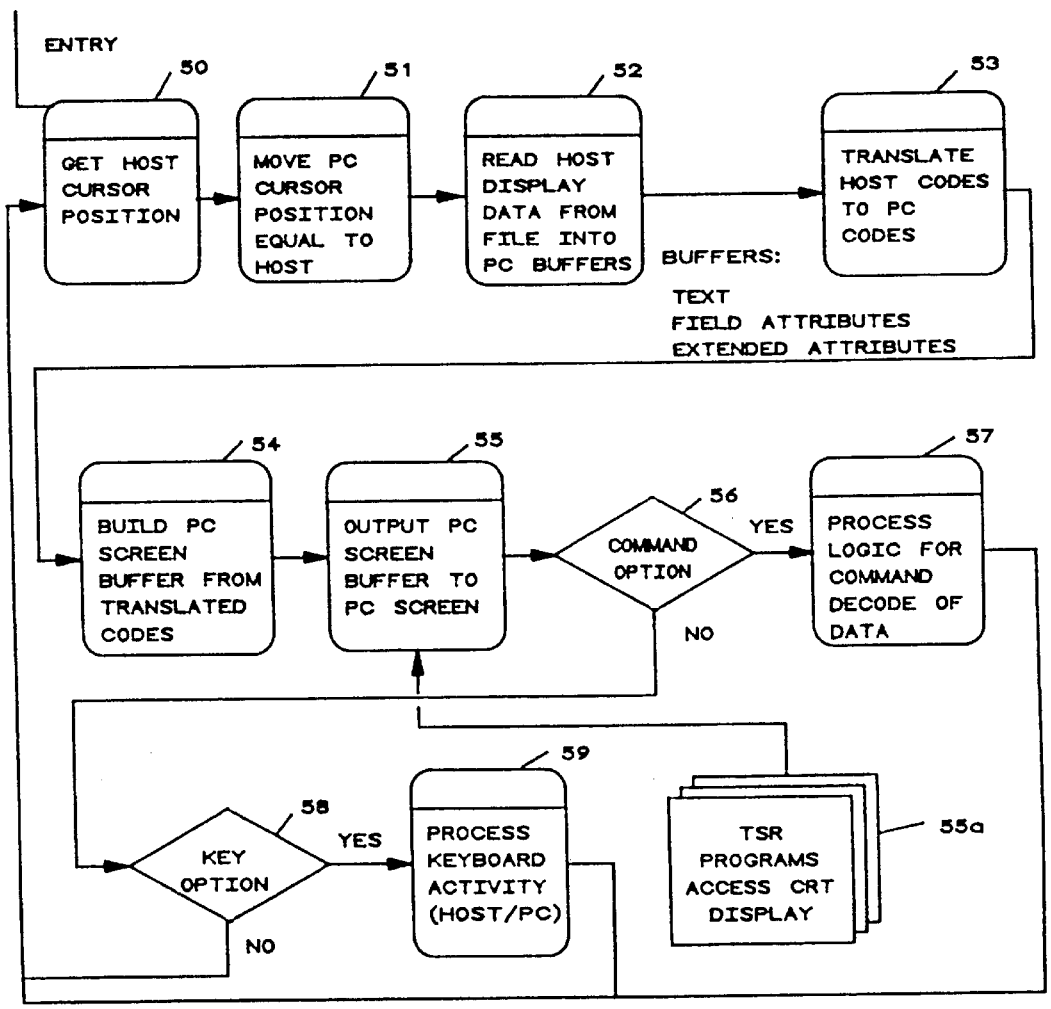
FIG. 5 is a programming flow chart including the portion of the program which converts data stored in the host computer into data which is displayed on the personal computer.

The reading of the host display buffer and subsequent display on the PC screen is set forth in detail in the data flow chart of FIG. 5. The entry into initial block 50 is made from appropriate branches such as shown broadly in FIG. 3 and in more detail in FIG. 4. The portion of the PC/host terminal emulation program represented in block 50 operates to obtain the row and column information representing the position of the cursor on the host display screen. This information is obtained by using the host interrupt and passed to the PC. Utilizing the PC interrupt facility, the PC/host terminal emulation program moves the PC cursor to the corresponding spot on the PC screen as shown in block 51. The PC/host terminal emulation program then causes the host text data buffer to be read and the information passed to the PC. In similar fashion, the PC/host terminal emulation program causes the host display (field) attributes and extended attributes to be read and passed to the PC.

Having obtained all the information on the host display and passed this information to buffers in the PC, as shown in block 52, the host codes for the text data, field attributes and extended attributes are converted to PC compatible codes, as shown at block 52. Despite the fact that the translation of block 53 puts the data into PC format, it is necessary to perform the operation of block 54 which converts the data into PC display codes corresponding to the display codes used by the host processor. The PC display codes are stored in the PC display buffer, shown in block 55, from which they drive the display, duplicating the display of the host.

Where the PC is operating under the direct control of a TSR program, the CRT display is generated by data from the TSR program as shown in block 55a.

At block 56, the PC/host terminal emulation program tests to see if a command exists in the data displayed on the PC screen. Since all the display data is tested, the text data, field attributes and extended attributes may all be used as the basis for commands. The commands are tested at block 57 and may be used by the PC/host terminal emulation program to cause actions within either or both the PC or host environments. For example, a command can cause a PC application program to be executed by "shelling"/returning to the PC DOS environment to execute a program. At the normal exit from the PC application program the return, via the shell, may return the user to the host environment in a fashion which remains completely transparent to the user. As previously described, certain keys may be used to call Terminate and Stay Resident (TSR) programs within the PC. These keys will override all other keys and can be used to call PC application programs such as spell checking and synonym selection. The PC/host terminal emulation program develops the appropriate command parameters which are then passed to a batch file in the PC DOS environment. The PC application is executed with normal PC functions until the user, or application program itself, exits from the application in the normal fashion.

When the refresh of the PC display is complete and in the event that the PC screen data does not contain command information, the test performed at block 56 branches to the test for keyboard activity at block 58. If there has been keyboard activity, the key strokes are examined. PC keystrokes are processed in normal PC fashion by block 59, and non-PC keystrokes are immediately passed to the host.

Figure 6:
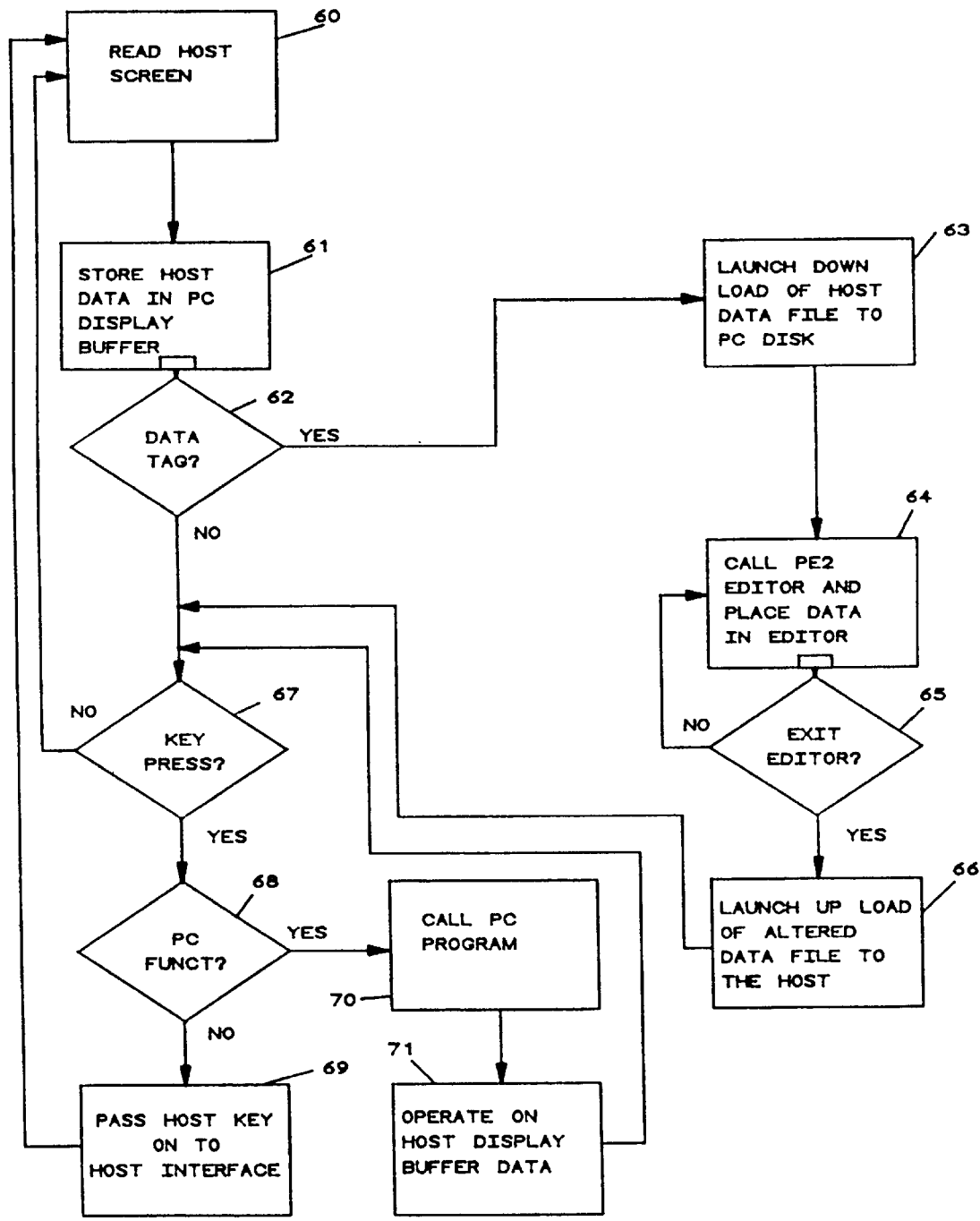
FIG. 6 is a programming flow chart including the portion of the program utilizing a personal computer program to process data which is stored in the host computer.

It is possible to automatically select a PC application program in response to the data downloaded to the PC from the host computer. This phase of the invention is shown in FIG. 6. In the example, the host data file is an XEDIT file created and used by the host program called XEDIT. While the XEDIT program is an acceptable approach to the editing problem, the PC application program PE2 (Personal Editor 2) would likely be more familiar to the PC user and presents advantages over XEDIT for this reason.

The PC/host terminal emulation program allows the user to specify certain parameters when the program is used. For example, it is possible to specify any personal computer application program in response to designators in the host file to be operated on. In the selected example, the host file is an XEDIT file. That is, the host data file to be operated on at the PC was created on the host with the use of the host program called XEDIT. There is a field in the data file, which may be a portion of the file name, which designates it as an XEDIT file. The PC/host terminal emulation program allows a user to designate which PC application program is to be called for each of the host application programs. In the example selected, the user has designated the PE2 application program to be called when a host data file of the XEDIT type is to be used.

Beginning with the reading of the host screen at block 60, the screen data is translated as previously described and stored in the PC screen buffer by the portion of the PC/host terminal emulation program represented by block 61. At this point the PC/host terminal emulation program tests the screen data for the existence of a data tag as shown in block 62. In the example selected, the data file on the host screen was generated using XEDIT, an editing program in common use on large systems. The user profile generated on the PC specified that when an XEDIT data file was retrieved from the host and loaded into the PC for further processing, the file was to be processed with the PE2 application program instead of XEDIT. When the test at block 62 detects that the displayed portion of the file is a data file, generated with XEDIT file, it causes the download of the entire data file as shown in block 63 and automatically calls the PC application program PE2 in block 64.

Control of the PC then rests with PE2, allowing the user to edit the data file with this application program. The PC/host terminal emulation program simply waits until the user exits from PE2 in the normal fashion. This exit is detected at block 65. In the absence of the exit command, the PC/host terminal emulation program continues the loop between block 64 and block 65, holding the PC in the PE2 application program.

On detection of the normal exit command from the PC application program PE2 by the portion of the program represented by block 65, the PC/host terminal emulation program branches to block 66. This causes the altered data file to be uploaded back to the host. When this operation is completed, the program proceeds to block 67, which tests to see if a key has been depressed. If there has been no key depression, the program reenters the main loop beginning at block 60, to see if new data is available at the host screen.

In the case where a key has been depressed, the branch from block 67 proceeds to block 68 which evaluates the key depressed to see if it calls a PC function, that is, to determine if the depressed key specifies an operation which requires the use of a PC application program. If the depressed key is not one which requires a PC application program, the keystroke is one which is to be passed to the host for action. The PC/host terminal emulation program branches to block 69, which passes the keystroke to the host and reenters the program at block 60.

In the case where the depressed key requires the intervention of a PC application program, say, for example, a spelling check, the portion of the program represented by block 70 operates to call the specified PC program, which then may be used in conventional fashion to operate on the display data as shown in block 71. When the PC application program is exited, the program branches back to block 67, to check for further key depressions.

It will be appreciated that the loop which includes blocks 67, 68, 70 and 71 is operative to call such popular PC application programs as "Lightning", a spelling checker program marketed by Borland International. The user would specify that the "Lightning" program is to be active when in the PC mode of operation; that is, when in the loop defined by blocks 67, 68, 70 and 71. In this mode, the "Lightning" program checks the spelling of each word as it is typed and emits a beep when the word is spelled incorrectly. By depressing a "hot" key, that is, one which operates to call a specific PC application program, the user may invoke the portion of "Lightning" which allows the user to look up the most probable correct spelling of the misspelled word. Return to the normal mode of operation is made by depressing the appropriate "hot" key or by the application program which may operate to terminate itself when the requested function has been completed.

Figures 7, 8:
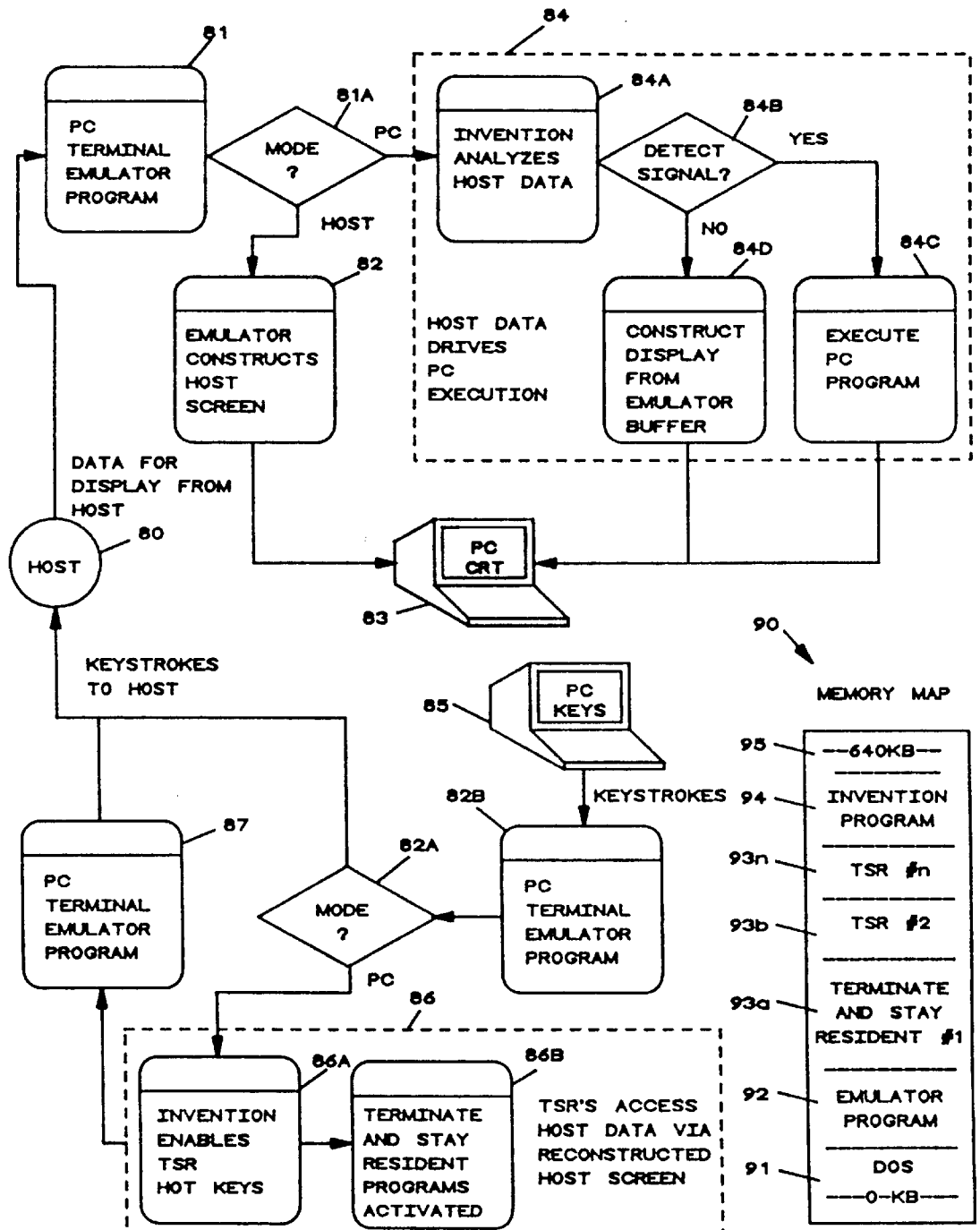
FIG. 7 is a memory map for a personal computer configured according to the invention.
FIG. 8 is a flowchart-hardware portrayal of a system according to the invention showing how data from the host and keystrokes at the personal computer may each be used to call PC application programs.

FIG. 7 shows how the PC memory is partitioned. The DOS operating system is located in the low address portion of random access memory and the terminal emulator program, for example, the IBM PC 3270 Emulation Program is located at the next higher address. The next higher addresses contain the terminate and stay resident application programs for the personal computer. The program of this invention lies in location, just above the TSR programs and the remaining memory is available for general use by the system.

FIG. 8 further illustrates the fashion in which the emulation program of this invention utilizes host data to call a PC application program and the fashion in which the hot keys are used to call application programs. Beginning with the case where the host data processing system 80 supplies data to the PC for display on the PC CRT, blocks 81 and 81*a* of the emulation program pass the data along alternate paths dependent on whether the system is operating in the host mode or the PC mode. In the event that the system is in the host mode, the data for display is processed by block 82 of the emulator program to construct the PC screen as if it were the host screen. The screen information is then passed to the PC CRT display 83. In the alternative, PC mode, the functions contained in portion 84, are performed. Blocks 84*a* and 84*b* of the emulator program of this invention examine the host data sent to the PC for display to determine if the data contains control information. If it does, the program branches to block 84*c* to execute the PC application program called for by the control information. In the normal situation, the PC application program then assumes control of the CRT display 83 for the display of information associated with the application program. If the display information from the host is simply display data and does not contain control information, the program branches to block 84*d*, which is effective to construct the display for the CRT 83.

In the case where data is entered by means of keystrokes at keyboard 85, blocks 82 and 82*a* of the emulation program detect and route keystrokes in a fashion similar to blocks 81 and 81*a* previously discussed. If the keystrokes are made when the system is in the host mode, they are passed directly to the host as shown. However, when the system is operating in the PC mode, the function illustrated generally in portion 86 is operative and keystrokes are routed to block 86*a*, which examines each keystroke and sequence of keystrokes to see if a terminate and stay resident program function is specified. In the case where a terminate and stay resident program function is specified, the program branches to block 86*b* which is effective to actuate the portion of the program associated with the desired function. Where the keystrokes are not those which specify a terminate and stay resident program function, they are passed to the host via portion 87 of the terminal emulator program.

APPENDIX A

Page 1

```
 1: 0 (*$R-*)      (*Range checking off*)
 2: 0 (*$B-*)      (*Boolean complete evaluation off*)
 3: 0 (*$S+*)      (*Stack checking on*)
 4: 0 (*$I+*)      (*I/O checking on*)
 5: 0 (*$N-*)      (*No numeric coprocessor*)
 6: 0 (*$M 6000,0,0*) (*stack, min. heap, max. heap*)  (*HEAP SIZE WILL BE MANAGED
 7: 0                                         DYNAMICALLY DURING PROGRAM*)
 8: 0
 9: 0
10: 0 (***********************                  ***************)
11: 0
12: 0 (* This edition of SEAMLESS accepts input at the PC command line. The input *)
13: 0 (*  is processed in Unit SEAM_PC3  (SEAM_PC3.PAS).  The command-line     *)
14: 0 (*  input is analyzed as to whether it is (1) a PC utilities/PC data     *)
15: 0 (*  request, or (2) a PC utility/Host data request. Some error-checking  *)
16: 0 (*  is done, and DOS is shelled-out to.  THIS VERSION OF SEAMLESS USES   *)
17: 0 (*  DYNAMIC ALLOCATION FOR THE BIG SCREEN BUFFERS, AND DYNAMIC CONTROL OF
18: 0 (*  HEAP SIZE.  This makes SEAMLESS as small as possible in RAM at the time *)
19: 0 (*  that other PC utilities (e. g., editors) are loaded.             *).
20: 0
21: 0
22: 0 PROGRAM Seamless;
23: 0
24: 0 USES  CRT,
25: 0       DOS,
26: 0       Unit_Sup,
27: 0       Unit_Scn,
28: 0       Unit_Key,
29: 0       Unit_Utl,
30: 0       Unit_Mem,
31: 0       Seam_Utl,     (* Provides utility routines for SEAMLESS *)
32: 0       Seam_PC3;     (* Processes requests for PC utilities   *)
33: 0
34: 0 TYPE
35: 0   Double_Screen_Buffer = ARRAY [1..3840] OF Byte;
36: 0   DScrBufPtr =           ¬ Double_Screen_Buffer;
37: 0   Screen_Buffer =        ARRAY [1..1920] OF Byte;
38: 0   ScrBufPtr =            ¬ Screen_Buffer;
39: 0
40: 0 VAR
41: 0   Ch:          Char;
42: 0   FirstTime:   Boolean;
43: 0   Error:       Integer;
44: 0   ErrorCode:   Word;
45: 0   PC_Util_Req: Boolean;
46: 0   Size:        _ProgSize;   (* used in development only *)
47: 0   ProgramSize: word;        (*  "    "   "    "  *)
```

Page 2

```
48: 0
49: 0
50: 0
51: 0 PROCEDURE INNER          (VAR PC_Util_Req: Boolean;
52: 0                          FirstTime :      Boolean);
53: 0
54: 0 VAR
55: 0    Extended_Attr,
56: 0    Field_Attr,
57: 0    Text_Attr:        ScrBufPtr;
58: 0    Color_Data:       DScrBufPtr;
59: 0    StuffString:      STRING;
60: 0    HeapSize1, HeapSize2: Longint;
61: 0    F1Size, F2Size:   Word;
62: 0    NewAvail:         Longint;
63: 0    ErrorCode:        Word;
64: 0
65: 0
66: 0
67: 0 (***************************** GET_INPUT *****************************)
68: 0 (* PROCEDURE   Get_Input                                            *)
69: 0 (* PURPOSE:    This is the major looping part of SEAMLESS. As long as a  *)
70: 0 (*            grey minus sign is not hit, the loop intakes characters    *)
71: 0 (*            from the keyboard buffer and sends them to the host. The   *)
72: 0 (*            host response is received in module "Update_Screen", which *)
73: 0 (*            is called (when appropriate) by this module. The Keypad    *)
74: 0 (*            "-" is a hot-key to end SEAMLESS. The Keypad "+" is a      *)
75: 0 (*            hot-key to bring user to the PC-command-line.              *)
76: 0 (* CALLED BY: Inner                                                      *)
77: 0
78: 0 PROCEDURE Get_Input       (Host: Integer;
79: 0                            FirstTime: Boolean);
80: 0
81: 0 VAR
82: 0   Ch, XCh : Char;
83: 0   ChString: STRING[15];
84: 0   Flag:     Boolean;        (* "Flag" is used when determining color
85: 0                                in which user input should show.     *)
86: 0   Password: Boolean;
87: 0   PC_Color: Integer;
88: 0   ScanCode: Byte;
89: 0   StuffString: STRING;
90: 0   X, Y, Z: Integer;
91: 0   A, B, BotScan, TopScan: Byte;    (* for Blaise __WhereScn *)
92: 0
93: 0
94: 0   (***************************** UPDATE_SCREEN *****************************)
```

Page 3

```
 95: 0   (* PROCEDURE   Update_Screen                              *)
 96: 0   (* PURPOSE:     refreshes the screen by reading from the HOSTSYS file. *)
 97: 0   (* CALLED BY:   Get_Input                                 *)
 98: 0
 99: 0   PROCEDURE Update_Screen      (VAR Flag: BOOLEAN);
100: 0
101: 0      (* GLOBAL VARIABLES accessed by procedures within Update_Screen: *)
102: 0      (*     Text_Attr, Field_Attr, Extended_Attr: ScrBufPtr;   *)
103: 0      (*     NumBytes:              Integer              *)
104: 0
105: 0   VAR
106: 0      Ch:         Char;
107: 0      Flag2:      Boolean;
108: 0      ScanCode:   Byte;
109: 0      TopScan,
110: 0      BotScan:    Integer;   (* for Blaise "_WhereScn" *)
111: 0      SeamReq:    ByteArray;
112: 0      Msg:        STRING;    (* for PC-command line prompt *)
113: 0
114: 0   (******* PROCEDURE Update_Screen contains nested procedures      ***)
115: 0
116: 0
117: 0
118: 0   (************************ READSCREEN **************************)
119: 0   (* PROCEDURE   ReadScreen                                 *)
120: 0   (* PURPOSE:    This module reads one host-screen worth of data into *)
121: 0   (*             one of three buffers (Text_Attr, Field_Attr, or   *)
122: 0   (*             Extended_Attr), as determined by the value of Buffer *)
123: 0   (*             passed in. The value of Attr passed in tells      *)
124: 0   (*             HOSTSYS whether to read text, field attributes, or *)
125: 0   (*             extended field attributes.                 *)
126: 0   (* CALLED BY:  Update_Screen                              *)
127: 0
128: 0   PROCEDURE ReadScreen      (Buffer:   ScrBufPtr;
129: 0                              Attr:    Integer);
130: 0      (* GLOBAL VARIABLES NumBytes, Host: Integer *)
131: 0
132: 0   VAR
133: 0      Error:    Integer;         (* variable for Blaise routine *)
134: 0      NumRead:  Integer;         (* variable for Blaise routine *)
135: 0      Locate_Buf : Three_Byte_Buffer;
136: 0      Which_Attr : Two_Byte_Buffer;
137: 0      I:        Integer;
138: 0
139: 1   BEGIN
140: 1        (* SET LOCATION TO READ AT 0, 0 *)
141: 1      Locate_Buf[1] := $01;      (* HOSTSYS subfunction for Int 4403H; *)
```

Page 4

```
142: 1        Locate_BufIIl2" := $00;      (* sets location to begin reading at *)
143: 1        Locate_BufIIl3" := $00;      (* 0, 0                              *)
144: 1        Regs.AX := $4403;
145: 1        Regs.BX := Host;
146: 1        Regs.CX := 3;
147: 1        Regs.DX := Ofs (Locate_BufIIl1");
148: 1        Regs.DS := Seg (Locate_BufIIl1");
149: 1        MsDos (Regs);
150: 1
151: 1              (* TELL HOSTSYS WHICH ATTRIBUTES TO READ *)
152: 1        Which_AttrIIl1" := $F0;      (* HOSTSYS subfunction for Int 4403H; *)
153: 1        Which_AttrIIl2" := Attr;     (* Attr = 0 for text, 1 for field,    *)
154: 1        Regs.AX := $4403;            (*        2 for extended              *)
155: 1        Regs.BX := Host;
156: 1        Regs.CX := 2;
157: 1        Regs.DX := Ofs(Which_AttrIIl1");
158: 1        Regs.DS := Seg(Which_AttrIIl1");
159: 1        MsDos (Regs);
160: 1
161: 1              (* READ FROM HOSTSYS FILE INTO BUFFER *)
162: 1        Regs.AX := $3F00;            (* Code copied from Blaise 3.0 *)
163: 1        Regs.BX := Host;             (* routine __ReadFil.          *)
164: 1        Regs.DS := Seg(Buffer¬fIl1");
165: 1        Regs.DX := Ofs(Buffer¬fIl1");
166: 1        Regs.CX := NumBytes;
167: 1        MsDos (Regs);
168: 0    END;         (* ReadScreen *)
169: 0
170: 0  (************************* CONVERT_EXT_ATTR *********************)
171: 0  (* PROCEDURE     Convert_Ext_Attr                              *)
172: 0  (* PURPOSE:      Accepts as input a buffer with host extended  *)
173: 0  (*              attributes, and converts these to the appropriate PC *)
174: 0  (*              colors to match host colors. In the case that the *)
175: 0  (*              host sends no extended attributes (ex: VM Vamp  *)
176: 0  (*              screen), field attributes are used to emulate host *)
177: 0  (*              default colors.                                *)
178: 0  (* CALLED BY: Update_Screen                                    *)
179: 0
180: 0  PROCEDURE Convert_Ext_Attr  (VAR Extended_Attr: ScrBufPtr;
181: 0                              VAR Field_Attr:    ScrBufPtr);
182: 0              (* NumBytes: Integer accessed globally *)
183: 0  VAR
184: 0      I:   Integer;
185: 0
186: 1  BEGIN
187: 1      FOR I := 2 TO (NumBytes) DO   (* set 0's to real numbers *)
188: 2      BEGIN
```

Page 5

```
189: 2        IF Field_Attr¬fIII" = 0 THEN
190: 2           Field_Attr¬fIII" := Field_Attr¬fIII-I";
191: 2        IF Extended_Attr¬fIII" = 0 THEN
192: 2           Extended_Attr¬fIII" := Extended_Attr¬fIII-I" ;
193: 1        END;
194: 1
195: 1        FOR I := 1 TO (NumBytes) DO
196: 2           BEGIN
197: 2 (*         IF (Extended_Attr¬fIII" AND 128) = 128 THEN   (* REVERSE VIDEO BIT *)
198: 2
199: 2 (* The idea is to set low 4 bits to 0, for black characters, and move    *)
200: 2 (* appropriate PC color bits into bits 4--6, for background color. It    *)
201: 2 (* doesn't work very well, it slows performance, and it looks horrible.  *)
202: 2
203: 3           CASE (Extended_Attr¬fIII" AND 127) OF   (* set bit 7 to 0  *)
204: 3              8:  Extended_Attr¬fIII" := 1 SHL 4;  (* dark blue *)
205: 3              16: Extended_Attr¬fIII" := 4 SHL 4;  (* dark red *)
206: 3              24: Extended_Attr¬fIII" := 5 SHL 4;  (* magenta *)
207: 3              32: Extended_Attr¬fIII" := 2 SHL 4;  (* dark green *)
208: 3              40: Extended_Attr¬fIII" := 3 SHL 4;  (* cyan    *)
209: 3              48: Extended_Attr¬fIII" := 6 SHL 4;  (* brown   *)
210: 3              56: Extended_Attr¬fIII" := 7 SHL 4;  (* light grey *)
211: 3           ELSE Extended_Att¬fIII" := 7 SHL 4;
212: 2           END   (* CASE *)
213: 2        ELSE                                        *)
214: 2
215: 3           CASE Extended_Attr¬fIII" OF
216: 3              8:  Extended_Attr¬fIII" := 9;    (* blue *)
217: 3              16: Extended_Attr¬fIII" := 12;   (* red *)
218: 3              24: Extended_Attr¬fIII" := 13;   (* pink *)
219: 3              32: Extended_Attr¬fIII" := 10;   (* green *)
220: 3              40: Extended_Attr¬fIII" := 11;   (* turquoise *)
221: 3              48: Extended_Attr¬fIII" := 14;   (* yellow *)
222: 3              56: Extended_Attr¬fIII" := 15;   (* white *)
223: 3
224: 3              (* IF NO EXTENDED ATTRIBUTES, USE FIELD ATTRIBUTES *)
225: 3
226: 4              0:  CASE (Field_Attr¬fIII" AND 254) OF   (* set bit 0 to 0 *)
227: 4                    0:   Extended_Attr¬fIII" := 10;
228: 4                    4:   Extended_Attr¬fIII" := 14;
229: 4                    14:  Extended_Attr¬fIII" := 12;
230: 4                    64:  Extended_Attr¬fIII" := 10;
231: 4                    76:  Extended_Attr¬fIII" := 0;   (* password field *)
232: 4                    92:  Extended_Attr¬fIII" := 10;
233: 4                    96:  Extended_Attr¬fIII" := 11;
234: 4                    200: Extended_Attr¬fIII" := 12;
235: 4                    204: Extended_Attr¬fIII" := 0;   (* password field *)
```

Page 6

```
236: 4                   220: Extended_Attr^[I] := 12;
237: 4                   224: Extended_Attr^[I] := 11;
238: 4                   232: Extended_Attr^[I] := 15;
239: 4                   240: Extended_Attr^[I] := 11;
240: 4                   248: Extended_Attr^[I] := 15;
241: 4              ELSE Extended_Attr^[I] := 6;   (* brown *)
242: 3              END;     (* CASE *)
243: 3  (*!!! THIS DOES NOT YET INCORPORATE REVERSE VIDEO, UNDERSCORE, ETC. !!*)
244: 3         ELSE Extended_Attr^[I] := 7;       (* grey *)
245: 2       END;    (* CASE *)
246: 1     END;      (* FOR *)
247: 0  END;         (* Convert_Ext_Attr *)
248: 0
249: 0
250: 0  (************************ PRINT_SCREEN ************************)
251: 0  (* PROCEDURE   Print_Screen                                   *)
252: 0  (* PURPOSE:    merges text- and extended-attributes into single *)
253: 0  (*            buffer, which is sent to video screen using BLAISE *)
254: 0  (*            routine "FastScn".                              *)
255: 0  (* CALLED BY:  Update_Screen                                  *)
256: 0
257: 0  PROCEDURE Print_Screen      (Text_Attr:     ScrBufPtr;
258: 0                               Extended_Attr: ScrBufPtr;
259: 0                               Color_Data:    DScrBufPtr);
260: 0                      (* NumBytes: Integer accessed globally *)
261: 0  VAR
262: 0    I, J:     Integer;
263: 0
264: 1  BEGIN
265: 1    (* This loop merges the text and extended-attribute buffers into *)
266: 1    (* one single buffer, in alternating order... char, attr, char, *)
267: 1    (* attr...                                                  *)
268: 1    J := 1;
269: 1    FOR I := 1 TO (NumBytes) DO
270: 2      BEGIN
271: 2        IF (Field_Attr^[I] AND 12) = 12 THEN  (* IF PASSWORD FIELD, *)
272: 2          Text_Attr^[I] := 0;              (* SET TEXT TO NULLS *)
273: 2        Color_Data^[J] := Text_Attr^[I];
274: 2        J := J + 1;
275: 2        Color_Data^[J] := Extended_Attr^[I];
276: 2        J := J + 1;
277: 1      END;
278: 1    FastScn (1, 1, @Color_Data^[1], NumBytes, 0, 0, 2);
279: 0  END;                         (* Blaise Pascal Routine *)
280: 0
281: 0
282: 0
```

Page 7

```
283: 0     (****************** PROCEDURE CHECK_PC_UTIL ********************)
284: 0     (* This procedure uses REXX Exec's on VM to gain information, and has *)
285: 0     (* been temporarily decomissioned.  Jeff Boston feels it may be the   *)
286: 0     (* only way to interface with menus on VM.                            *)
287: 0
288: 0     PROCEDURE Check_PC_Util_Req;   (* accesses PC_Util_Req and Message *)
289: 0                         (*      globally          *)
290: 0
291: 0     VAR
292: 0       SeamReq: STRING;
293: 0
294: 1     BEGIN
295: 1       SeamReq := '        ';    (* to initialize length byte *)
296: 1       _ReadScn(1, 1, @SeamReq[fl1",8, CHNOMOVE_SCN);
297: 1       IF SeamReq = 'SEAMLESS' THEN
298: 2         BEGIN
299: 2           PC_Util_Req := TRUE;
300: 2           _ReadScn(1, 1, @Message, 160,0);
301: 1         END
302: 1       ELSE
303: 1         PC_Util_Req := FALSE;
304: 0     END;
305: 0
306: 0
307: 1     BEGIN          (****** PROCEDURE UPDATE_SCREEN **)
308: 1       Flag := TRUE;
309: 1       Flush_Host;
310: 1       ReadScreen (Text_Attr, 0);
311: 1       ReadScreen (Field_Attr, 1);
312: 1       ReadScreen (Extended_Attr, 2);
313: 1       Convert_Ext_Attr (Extended_Attr, Field_Attr);
314: 1       Print_Screen (Text_Attr, Extended_Attr, Color_Data);
315: 1 (*   Check_PC_Util_Req;
316: 1       IF PC_Util_Req THEN
317: 1         BEGIN
318: 1           SendKey ('fllclear"');
319: 1           EXIT;
320: 1         END;  *)
321: 1       Msg := ' = = > > ';
322: 1       _FastScn(6,25,@Msg[fl1",Length(Msg),12, BLACK, USEATTR_SCN);
323: 1       Msg := ' Depress grey "+" to use PC command line';
324: 1       _FastScn(11,25,@Msg[fl1",Length(Msg), LIGHTGRAY, BLACK, USEATTR_SCN);
325: 1       Place_Cursor (0, 0, 0);
326: 1       Host_Thinking;
327: 1
328: 1       WHILE NOT KeyPressed DO        (************ NOTE !!! **********)
329: 2         BEGIN                  (* USE OF "EXIT" STATEMENT IS    *)
```

Page 8

```
330: 2      Flush_Host;                  (* EXCEPTIONAL, AND IS DONE TO   *)
331: 2      IF KeyPressed THEN EXIT;        (* MAXIMIZE SPEED OF RETURN TO   *)
332: 2      ReadScreen (Text_Attr, 0);   (* MODULE "GET_INPUT", WHICH    *)
333: 2      IF KeyPressed THEN EXIT;        (* PROCESSES ALL KEYSTROKES.    *)
334: 2      ReadScreen (Field_Attr, 1);  (* (normally, the use of EXIT is *)
335: 2      IF KeyPressed THEN EXIT;        (* avoided as not consistent with *)
336: 2      ReadScreen (Extended_Attr, 2);  (* structured programming. ********)
337: 2      IF KeyPressed THEN EXIT;
338: 2      Convert_Ext_Attr (Extended_Attr, Field_Attr);
339: 2      IF KeyPressed THEN EXIT;
340: 2      Print_Screen (Text_Attr, Extended_Attr, Color_Data);
341: 2 (*      Check_PC_Util_Req;
342: 2      IF PC_Util_Req THEN
343: 2         BEGIN
344: 2           SendKey ('fflclear"');
345: 2           EXIT;
346: 2         END;        *)
347: 2      IF KeyPressed THEN EXIT;
348: 2      Place_Cursor (0, 0, 0);
349: 2      (* IF KeyPressed THEN EXIT;
350: 2      Host_Thinking;*)
351: 1    END;         (* WHILE *)
352: 0 END;          (* Update_Screen *)
353: 0
354: 0
355: 0 (************************** PC_COMMAND_LINE **********************)
356: 0 PROCEDURE PC_Command_Line (VAR PC_Util_Req: Boolean);
357: 0        (* Message accessed globally *)
358: 0 VAR
359: 0   I:        Integer;
360: 0   StuffString: STRING;
361: 0
362: 1 BEGIN
363: 1   Place_Cursor (1, 24, 10);
364: 1   _COffScn(TRUE);
365: 1   FOR I := 1 TO 60 DO       (* erase instruction *)
366: 1     Write (' ');
367: 1   Place_Cursor (1, 24, 10);
368: 1   _COffScn(FALSE);
369: 1   TextColor (15);
370: 1   IF EOLN THEN Readln;
371: 1   Read (Message);
372: 1   IF (Length(Message) = 0) THEN
373: 1     PC_Util_Req := FALSE
374: 1   ELSE
375: 1     PC_Util_Req := TRUE;
376: 0 END;       (* PC_Command_Line *)
```

Page 9

```
377: 0
378: 0
379: 1  BEGIN    (*** Get_Input ***)
380: 1    Update_Screen (Flag);
381: 1    Place_Cursor (0, 0, 0);
382: 1    _CSetScn (_CBottom);
383: 1    _COffScn (FALSE);
384: 1    Flag := TRUE;              (* "Flag" controls checking for VM *)
385: 1                               (* colors at the first printable *)
386: 1    Ch := _ExInKey (TRUE, ScanCode);   (* char following a screen update *)
387: 1
388: 1    WHILE ScanCode < > 74 DO           (* pad minus sign *)
389: 2    BEGIN
390: 2      IF ORD(Ch) = 0 THEN              (* no character returned; ASCII 0 *)
391: 3      BEGIN
392: 4        CASE ScanCode OF
393: 5          59: BEGIN  SendKey ('fflpf1"');
394: 4                  Update_Screen (Flag); END;
395: 5          60: BEGIN  SendKey ('fflpf2"');
396: 4                  Update_Screen (Flag); END;
397: 5          61: BEGIN  SendKey ('fflpf3"');
398: 4                  Update_Screen (Flag); END;
399: 5          62: BEGIN  SendKey ('fflpf4"');
400: 4                  Update_Screen (Flag); END;
401: 5          63: BEGIN  SendKey ('fflpf5"');
402: 4                  Update_Screen (Flag); END;
403: 5          64: BEGIN  SendKey ('fflpf6"');
404: 4                  Update_Screen (Flag); END;
405: 5          65: BEGIN  SendKey ('fflpf7"');
406: 4                  Update_Screen (Flag); END;
407: 5          66: BEGIN  SendKey ('fflpf8"');
408: 4                  Update_Screen (Flag); END;
409: 5          67: BEGIN  SendKey ('fflpf9"');
410: 4                  Update_Screen (Flag); END;
411: 5          68: BEGIN  SendKey ('fflpf10"');
412: 4                  Update_Screen (Flag); END;
413: 4          15: SendKey ('fflbacktab"');
414: 4          69: ;
415: 4          70: ;
416: 4          71: SendKey ('fflhome"');       (* Home *)
417: 4          72: SendKey ('fflup"');         (* up arrow *)
418: 4          73: ;                           (* page up *)
419: 4          75: SendKey ('fflleft"');       (* left arrow *)
420: 4          77: SendKey ('fflright"');      (* right arrow *)
421: 4          79: SendKey ('fflfastright"');  (* End key *)
422: 4          80: SendKey ('flldown"');       (* down arrow *)
423: 4          81: ;                           (* page down *)
```

Page 10

```
424: 4       82: SendKey ('fflinsert''');         (* insert *)
425: 5       83: BEGIN  SendKey ('ffldelete''');   (* delete *)
426: 4              Update_Screen (Flag);  END;
427: 5      104: BEGIN  SendKey ('fflpf11''');
428: 4              Update_Screen (Flag);  END;
429: 5      105: BEGIN  SendKey ('fflpf12''');
430: 4              Update_Screen (Flag);  END;
431: 5      112: BEGIN  SendKey ('fflpa1''');
432: 4              Update_Screen (Flag);  END;
433: 5      113: BEGIN  SendKey ('fflpa2''');
434: 4              Update_Screen (Flag);  END;
435: 4      120: ;      (* ChangeColors (Attr_Table); *)   (* ALT-1 *)
436: 4                  (* Update_Screen (Flag) *)
437: 3      END;        (* CASE *)
438: 2      END         (* IF Ch = NUL *)
439: 2      ELSE        (* Ch <> NUL *)
440: 3      CASE ScanCode OF
441: 4       28: BEGIN  SendKey ('fflenter''');
442: 3              Update_Screen (Flag);  END;
443: 4        1: BEGIN  SendKey ('fflclear''');    (* ESC key *)
444: 3              Update_Screen (Flag);  END;
445: 4       14: BEGIN  _WhereScn (A, B, TopScan, BotScan);
446: 4              Y := B;
447: 4              X := A;
448: 4              Place_Cursor (1, (Y - 1), (X - 2));
449: 4              Write (' ');
450: 3              SendKey ('fflbackspace''');  END;
451: 3       15:    SendKey ('ffltab''');
452: 3       78:  (*   SendKey ('fflnewline'''); *)   (* grey plus sign *)
453: 3
454: 3 (*WE ARE TEMPORARILY ASSUMING THAT USER MUST NOT ACCESS PC COMMAND LINE
455: 3 (*EXCEPT WITHIN VM ENVIRONMENT THAT HAS TRUE COMMAND LINE (e. g., XEDIT,*)
456: 3 (*FILELIST, ETC.                                                      *)
457: 4            BEGIN
458: 4              SendKey ('fflclear''');  (*to get to command line*)
459: 4                       (*on VM side           *)
460: 4              PC_Command_Line (PC_Util_Req);
461: 4              IF PC_Util_Req THEN EXIT
462: 4              ELSE Update_Screen (Flag);
463: 3            END;
464: 4      ELSE BEGIN
465: 4            IF Flag THEN         (* 1st char after <ENTER> *)
466: 5              BEGIN
467: 5              Get_Host_Stats (HostStats);
468: 5              X := HostStats[5];     (* cursor col *)
469: 5              Y := HostStats[4];     (* cursor row *)
470: 5              Z := (Y * 80) + X;
```

Page 11

```
471: 5                    TextColor (Extended_Attr¬"Z");
472: 5                    Flag := FALSE;
473: 4              END;
474: 4
475: 4 (* BITS 2 AND 3 COME ON FOR NON-DISPLAYED FIELDS, I. E. PASSWORDS. TO  *)
476: 4 (* PROTECT PASSWORDS, THE VARIABLE "Ch" IS SENT TO THE HOST, WHILE THE *)
477: 4 (* VARIABLE "XCh" IS PRINTED TO THE PC SCREEN. IN THE CASE OF PASSWORD *)
478: 4 (* FIELDS, "XCh" IS CONVERTED TO THE NULL CHARACTER.                  *)
479: 4
480: 4 (* If password field *)  IF (Field_Attr¬"Z" AND 12) = 12 THEN
481: 4 (* convert to NULL, *)     XCh := Chr(0)
482: 4 (* else          *)  ELSE
483: 4 (* leave as is.  *)     XCh := Ch;
484: 4                    Write (XCh);
485: 4
486: 4                    ChString := Ch;
487: 4                    SendKey (ChString);
488: 3                END;
489: 2        END;       (* CASE *)
490: 2        Place_Cursor (0, 0, 0);
491: 2 (*    IF PC_Util_Req THEN EXIT;       (* return to driver *)*)
492: 2        Ch := _ExInKey (TRUE, ScanCode)
493: 1      END;         (* WHILE *)
494: 0 END;              (* GetInPut *)
495: 0
496: 0 (******************************* MAIN PROGRAM ************************)
497: 1 BEGIN       (* Inner *)
498: 1   _HeapMem(10000,NewAvail,ErrorCode); (* Set heap to accomodate dynamically *)
499: 1                              (* allocated big buffers           *)
500: 1   IF FirstTime THEN          (* Only open a host file upon the first *)
501: 2     BEGIN                    (* time through.                   *)
502: 2       Open_Host (Host);
503: 2                              (* stuff a null ch. into keyboard buf. *)
504: 2       StuffString := #0;     (* the 1st time, so pop-ups work right *)
505: 2       StuffString := _StuffKey (StuffString);
506: 1     END
507: 1   ELSE
508: 1     SendKey ('fflclear'");
509: 1   PC_Util_Req := FALSE;
510: 1   Get_Host_Stats (HostStats);
511: 1   NumRows := HostStats[ffl2";
512: 1   NumCols := HostStats[ffl3";  (* These three variables are accessed *)
513: 1   NumBytes := NumRows * NumCols; (* globally by all procedures.    *)
514: 1   Mark(Text_Attr);
515: 1   New(Text_Attr);
516: 1   New(Field_Attr);
517: 1   New(Extended_Attr);
```

```
518: 1   New(Color_Data);
519: 1   Get_Input (Host, FirstTime);
520: 1   (* HeapSize1:= __TopHpMem(FISize);*)
521: 1   Release (Text_Attr);
522: 1   (* __HeapMem(0,NewAvail,ErrorCode);*)
523: 1   (* ProgramSize := __SizeMem(Size);
524: 1   writeln ('code size: ',(16*longint(Size._CodeSize)));
525: 1   writeln ('data size ',(16*longint(Size._Datasize)));
526: 1   writeln ('Stack size: ',(16*longint(Size._StackSize)));
527: 1   writeln ('Heap size: ',(16*longint(Size._HeapSize)));
528: 1   writeln ('Total size: ',ProgramSize, 'bytes');          *)
529: 1
530: 1   IF NOT PC_Util_Req THEN
531: 2     BEGIN
532: 2       Regs.AX := $3E00;           (* to close file *)
533: 2       Regs.BX := Host;
534: 2       MsDos(Regs);
535: 2       ClrScr;
536: 1     END;
537: 0 END;   (* inner *)
538: 0
539: 0
540: 0
541: 1 BEGIN      (* DRIVER *)
542: 1   ClrScr;
543: 1   PC_Util_Req := FALSE;
544: 1   FirstTime := TRUE;
545: 1   Inner (PC_Util_Req, FirstTime);
546: 1   FirstTime := FALSE;       (* so as not to open another HOSTSYS file   *)
547: 1                             (* upon return to inner program             *)
548: 1   WHILE PC_Util_Req DO
549: 2     BEGIN
550: 2       Process_PC_Util_Req (Message);   (* process PC-command-line request *)
551: 2       Inner (PC_Util_Req, FirstTime);  (* "Classic" SEAMLESS              *)
552: 1     END;
553: 0 END.
```

Page 13

```
A                    91  445  447
ATTR                 129  153
AX                   144  154  162  532
B                    91  445  446
BOOLEAN              42  45  51  52  79  84  86  99  107  356
BOTSCAN              91  110  445
BUFFER               128  164  165
BX                   145  155  163  533
BYTE                 35  37  88  91  108
BYTEARRAY            111
CH                   41  82
CHAR                 41  82  106
CHECK_PC_UTIL_REQ    288
CHR                  481
CHSTRING             83  486  487
CLRSCR               535  542
COLOR_DATA           58  259  273  275  278  314  340  518
CONVERT_EXT_ATTR     180  313  338
CRT                  24
CX                   146  156  166
DOS                  25
DOUBLE_SCREEN_BUFFER 35  36
DS                   148  158  164
DSCRBUFPTR           36  58  259
DX                   147  157  165
E00                  532
EOLN                 370
ERROR                43  133
ERRORCODE            44  63  498
EXIT                 331  333  335  337  339  347  461
EXTENDED_ATT         211
EXTENDED_ATTR        55  180  191  192  203  204  205  206  207  208  209
                     210  215  216
F0                   152
F00                  162
F1SIZE               61
F2SIZE               61
FALSE                303  368  373  383  472  509  543  546
FIELD_ATTR           56  181  189  190  226  271  311  313  334  338  480
                     516
FIRSTTIME            42  52  79  500  519  544  545  546  551
FLAG                 84  99  308  380  384  394  396
FLAG2                107
FLUSH_HOST           309  330
GET_HOST_STATS       467  510
GET_INPUT            78  519
HEAPSIZE1            60
HEAPSIZE2            60
```

Page 14

```
HOST                78  145  155  163  502  519  533
HOSTSTATS              467  468
HOST_THINKING          326
I                137  184
INNER               51  545  551
INTEGER             43  78
J                262  268  273  274  275  276
KEYPRESSED             328  331  333  335  337  339  347
LENGTH              322  324  372
LOCATE_BUF             135  141  142  143
LONGINT             60  62
MARK                514
MESSAGE             300  371  372  550
MSDOS               149  159  167  534
MSG                 112  321  322  323  324
NEW                 515  516  517  518
NEWAVAIL            62  498
NUMBYTES            166  187  195  269  278  513
NUMCOLS             512  513
NUMREAD             134
NUMROWS             511  513
OFS             147  157  165
OPEN_HOST           502
ORD             390
PASSWORD            86
PC_COLOR            87
PC_COMMAND_LINE     356  460
PC_UTIL_REQ         45  51  299  303  356  373  375
PLACE_CURSOR        325  348  363  367  381  448  490
PRINT_SCREEN        257  314  340
PROCESS_PC_UTIL_REQ  550
PROGRAMSIZE         47
READ            371
READLN          370
READSCREEN         128  310  311  312  332  334  336
REGS            144  145  146  147  148  149  154  155  156  157  158
                159  162  163  164  165  166  167  532  533  534
RELEASE             521
SCANCODE            88  108  386  388
SCRBUFPTR           38  57  128  180  181  257  258
SCREEN_BUFFER       37  38
SEAMLESS            22
SEAMREQ             111  292  295  296  297
SEAM_PC3            32
SEAM_UTL            31
SEG             148  158  164
SENDKEY             393  395  397  399
SIZE            46
```

Page 15

| | |
|---|---|
| STUFFSTRING | 59 89 360 504 505 |
| TEXTCOLOR | 369 471 |
| TEXT_ATTR | 57 257 272 273 |
| THREE_BYTE_BUFFER | 135 |
| TOPSCAN | 91 109 445 |
| TRUE | 299 308 364 375 384 386 492 544 |
| TWO_BYTE_BUFFER | 136 |
| UNIT_KEY | 28 |
| UNIT_MEM | 30 |
| UNIT_SCN | 27 |
| UNIT_SUP | 26 |
| UNIT_UTL | 29 |
| UPDATE_SCREEN | 99 380 394 396 398 400 402 404 406 408 410 412 426 428 430 432 434 442 444 462 |
| WHICH_ATTR | 136 152 153 157 158 |
| WORD | 44 47 61 63 |
| WRITE | 366 449 484 |
| X | 90 447 448 468 470 |
| XCH | 82 481 483 484 |
| Y | 90 446 448 469 470 |
| Z | 90 470 471 480 |
| _BLACK | 322 324 |
| _CBOTTOM | 382 |
| _CHNOMOVE_SCN | 296 |
| _LIGHTGRAY | 324 |
| _PROGSIZE | 46 |
| _USEATTR_SCN | 322 324 |
| __COFFSCN | 364 368 383 |
| __CSETSCN | 382 |
| __EXINKEY | 386 492 |
| __FASTSCN | 278 322 324 |
| __HEAPMEM | 498 |
| __READSCN | 296 300 |
| __STUFFKEY | 505 |
| __WHERESCN | 445 |

We claim:

1. A personal computer connected, for data entry change of a host processing system, to a communications interface comprising:
   a. a computer terminal emulation program resident in the personal computer for operating an emulation mode to utilize a first application program in the host processing system;
   b. means for converting a block of data of a data file from the host processing system, the block of data consisting of less than the entire data file and less than a full screen of the personal computer, into a format readable by the personal computer wherein the block of data is transferred from the host processing system to a buffer in the personal computer for processing in a personal computer mode;
   c. a terminate and stay resident application program resident within the personal computer for processing the block of data;
   d. means to selectively choose whether to process data in the emulation mode using the first application program in the host processing system, or terminate and stay resident application program in the personal computer; and,
   e. means for reconverting the block of data to the format of the host processing system and returning host data to the host processing system and be merged into the data file.

2. The personal computer of claim 1, including means for selecting between the emulation mode and the personal computer mode.

3. The personal computer of claim 2, wherein means for selecting is a keyboard command of the personal computer.

4. The personal computer of claim 2, wherein means for selecting is a user selected command of the personal computer.

5. A computing system comprising:
   a. a host processing system;
   b. a data file resident in the host processing system;
   c. a personal computer connected for data transmission to the host processing system by a communications interface;
   d. a terminal emulation program resident in the personal computer for communicating with the host processing system in an emulation mode for emulating a terminal connected to the host processing system;
   e. means for transferring a block of data from the data file in the host processing system to a buffer in the personal computer wherein the block of data consisting of less than the entire data file and less than and a full screen of the personal computer and for converting it to a format readable by the personal computer, wherein the personal computer can process data using an application program in the host processing system in the emulation mode;
   f. a terminate and stay program resident in the personal computer for operating on the block of data in the buffer in a personal computer mode;
   g. means for selecting between the emulation mode and the personal computer mode; and,
   h. means for returning the block of data to the host computer and for merging said data into the data file in the host system.

6. A system of claim 5, wherein means for selecting is a keyboard command of the personal computer.

7. A system of claim 5, wherein means for selecting is a user selected command of the personal computer.

* * * * *